United States Patent
Flam et al.

(10) Patent No.: US 7,788,115 B2
(45) Date of Patent: *Aug. 31, 2010

(54) SYSTEM AND METHOD FOR COORDINATION OF BENEFITS IN A HEALTHCARE SYSTEM

(75) Inventors: Seth Flam, San Diego, CA (US); Jonathan Flam, San Diego, CA (US); Sol Lizerbram, Rancho Santa Fe, CA (US)

(73) Assignee: HealthFusion, Inc., Solana Beach, CA (US)

( * ) Notice: Subject to any disclaimer, the term of this patent is extended or adjusted under 35 U.S.C. 154(b) by 971 days.

This patent is subject to a terminal disclaimer.

(21) Appl. No.: 11/494,952

(22) Filed: Jul. 28, 2006

(65) Prior Publication Data

US 2008/0027759 A1   Jan. 31, 2008

(51) Int. Cl.
*G06Q 40/00* (2006.01)
(52) U.S. Cl. ......................................................... 705/4
(58) Field of Classification Search .................... 705/4
See application file for complete search history.

(56) References Cited

U.S. PATENT DOCUMENTS

| | | | |
|---|---|---|---|
| 5,070,452 A | 12/1991 | Doyle et al. | |
| 2002/0123907 A1* | 9/2002 | Strayer | 705/2 |
| 2003/0149594 A1* | 8/2003 | Beazley et al. | 705/2 |
| 2004/0172313 A1* | 9/2004 | Stein et al. | 705/4 |
| 2004/0249665 A1* | 12/2004 | David | 705/2 |
| 2005/0102170 A1* | 5/2005 | Lefever et al. | 705/4 |
| 2005/0288972 A1* | 12/2005 | Marvin et al. | 705/4 |
| 2006/0047539 A1 | 3/2006 | Huang | |
| 2006/0149590 A1* | 7/2006 | Palmer et al. | 705/2 |
| 2006/0149603 A1* | 7/2006 | Patterson et al. | 705/4 |
| 2007/0005402 A1* | 1/2007 | Kennedy et al. | 705/4 |
| 2007/0005403 A1* | 1/2007 | Kennedy et al. | 705/4 |
| 2007/0027718 A1* | 2/2007 | Amerantes et al. | 705/3 |
| 2007/0083397 A1 | 4/2007 | Bryan | |
| 2007/0192146 A1* | 8/2007 | Menocal et al. | 705/4 |
| 2007/0239492 A1* | 10/2007 | Sweetland et al. | 705/4 |
| 2007/0239493 A1* | 10/2007 | Sweetland et al. | 705/4 |

OTHER PUBLICATIONS

Non-final Office Action received in U.S. Appl. No. 11/495,098, dated Aug. 5, 2009.

* cited by examiner

*Primary Examiner*—Jagdish N Patel
*Assistant Examiner*—Sara Chandler
(74) *Attorney, Agent, or Firm*—Foley & Lardner LLP (57) ABSTRACT

A healthcare system coordinating benefits includes a provider computer configured to receive patient information for a patient and to communicate a payment request to a payer computer. The provider computer includes programmed instructions to identify a coordination of benefits claim, obtain certain data from a response received from the payer computer in response to requests from the provider computer, store the certain data from the response, and provide the stored certain data in a coordination benefits claim.

20 Claims, 6 Drawing Sheets

FIGURE 1

| Total Claims: 12831 | | Search | Show Status Detail | Hide Status Summary | Claim Report |

| Payer | | Clearing House | |
|---|---|---|---|
| Denied : | | Paper : | |
| Finalized : 1 | | Accepted : | |
| Rejected-P : | | Rejected-CH : | |
| Received : | | Pended : | |
| InfoRequested : | | Processing Error : | |
| | | New : | |
| | | Submitted : | |

| CH Claim ID | 022306745 | Check EFT# | 132046415 | DOS | 02/02/06 |
|---|---|---|---|---|---|
| Created Date | 02/23/2006 | Method Date | CK 02/23/06 | Provider | |
| Service Date | 02/02/2006 | Status Date | 02/23/06 | Procedure | 99273 |
| Payer | Empire Medicare | Payer Claim ID | AAA1007500 | Charge | 120.00 |
| Patient | Lorin, Kathleen | Claim Category | Finalized Pmt | Ins. Paid | 100.00 |
| Status | Finalized | Claim Status | Processed | Patient | |
| Status Date | 02/23/2006 | Entity | Provider | Ins. Adjust. | |
| Charge | 120.00 | Type | U | Adjust. Codes | |
| Eligibility [Send] | Eligibility | | | FSR [Send] | |
| Status [Send] | RT CSI | | | | |
| Options | ☐☐☐☐ | | | | |

210

Search Claims                                          [Show all]

| Claim #: | | Patient Name: | |
|---|---|---|---|
| Check #: | | Provider Name: | |
| Created Date | From [ ] To [ ] | Claim Status Clearing House: | Select One ▽ |
| Status Date: | From [ ] To [ ] | Claim Status Payer: | Select One ▽ |
| Date of Service: | From [ ] To [ ] | | |
| Payer Name: | Select One | | ▽ |

[Search] [Clear all]

FIGURE 2

CMS 1500 Form | Claim Status | Printer friendly

Health Insurance Claim Form For Secondary Claim (COB)

| PAYER SELECTION | Payer That Will Receive This Claim: (Secondary Payer) | Aetna ▷ |
| | Payer That Was Already Billed For This Claim: (Primary Payer) | Empire Medicare New Jersey ▷ |

1. Select Insurance Program: Other (ID) ▷

○ New Patient
● Existing Patient

2. Patient's Name (Last, First, MI): [Lorin] [Kathleen] [ ]

3. Patient DOB: 02/15/1965    Sex: F ▷

1a. Insured's ID #: w123456789

4. Insured's Name (Last, First, MI): [Lorin] [Mike] [ ]

5. Patient's Address (Number, Street):
[1234] [Mockingbird Lane]
City: [San Diego]  State: CA
Zip Code: [12345]  Telephone: 8581234567

6. Patient's Relationship to Insured: Spouse ▷

7. Insured's Address:
[1234] [Mockingbird Lane]
City: [San Diego]  State: CA
Zip Code: [12345]  Telephone: 8581234567

8. Patient's Status:
Marital: Married ▷
Employment: ▷
Student: ▷

9. Other Insured's Name (Last, First, MI): [Lorin] [Kathleen] [ ]

a. Other Insured's Policy / Group #: empn12345   Sex: F ▷
b. Other Insured's DOB: 02/15/1965
c. Employer/School Name: Acme Seed
d. Ins. Plan Name: Empire Medicare NJ 10. Is Patient's Condition Related To:
a. Employment? No ▷
b. Auto Accident? No ▷
c. Other Accident? No ▷
State: ▷

10d. Reserved for Local Use?
Episode: ▷

11. Insured's Policy Group/FECA#:
a. Insured's DOB: 01/22/1960   Sex: F ▷
b. Employer/School: HealthFusion, Inc.
c. Insurance Plan Name: Aetna Open Access
d. Is There Another Health Benefit Plan?: Yes ▷

12. Patient's or Authorized Person's Signature:
Signed: Yes ▷   Date: 02/24/2006

13. Insured's or Authorized Person's Signature:
Signed: Yes ▷

FIGURE 3

| 14. Date of Current Illness (1st Symptom) or Injury (Accident) or Pregnancy (LMP): ▽ | 15. If Patient Has Had Same or Similar Illness Give First Date: | 16. Dates Patient Unable to Work: From ☐ To ☐ |
|---|---|---|
| 17. Name of Referring Physician / Other Source: ▽ | 17a. ID # of Referring Physician: ☐<br>17b. NPI: ☐ | 18. Hospitalization Dates for Current Services: From ☐ To ☐ |
| 19. Reserved for Local Use: ☐ | | 20. Outside Lab? ▽  Charges: ☐ |
| 21. Diagnosis or Nature of Illness or Injury:<br>1. 786.5  Chest Pain        3. ☐<br>2. ☐                              4. ☐ | | 22. Medicaid Resubmission:<br>Code: ☐  Orig. Ref #: ☐<br>23. Prior Auth. #: Primary Payer ID:<br>☐  aaa100007500 |
| Claim Level Adjustments (Optional). These are adjustments that were made to your claim that are not directly related to a specific service line. Select the Adjustment Category that Best Matches Your Primary EOB:  Group Code: ☐  Reason Code: ☐  Adj. Units/Qty: ☐  Adj. Amt: ☐  ← 410<br>Select an Adjustment Category ▽<br>+ Add More Claim Level Adjustment Rows |||
| 24. a. Date(s) of Service ☐ To ☐<br>     b. Place of Service ☐<br>     c. EMG ☐ | d. Procedures, Services or Supplies CPT/HCPS Modifier ☐<br>e. Diagnosis Center ☐<br>f. $ Charges ☐ | g. Days / Units ☐<br>h. HPSDT Fam. Plan ☐<br>i. ID Qual. ☐<br>j. Rendering Provider ID# ☐ |
| Service Level Adjustments. These are adjustments that were made to your claim that are directly related to a specific service line. Select the Adjustment Category that Best Matches Your Primary EOB:  Group Code: PR  Reason Code: 03  Adj. Units/Qty: ☐  Adj. Amt: 20.00  ← 420<br>Copayment ▽<br>+ Add More Claim Level Adjustment Rows |||

25. Federal Tax ID #
SSN ▷
123456789

26. Patient's Account #:
1234567

27. Accept Assignment?
Yes ▷

28. Total Charge:
$120.00

29. Amount Paid:
$100.00

30. Balance Due:
$20.00

31. Provider Signature (Select Physician or Supplier Including Tax ID):
Signed: Drew Robert ▷
Date: 02/23/2006

32. Name of Facility Where Services Were Rendered (If other than home or office):
Solana Beach Medical Center ▷
Facility Name
Solana Beach Med
Address 1
124 North Rios
Address 2
City
Solana Beach
State
CA ▷
Zip
92075

33. Physician's, Supplier's Billing Name, Address, Zip Code and Phone #
Solana Beach Medical Center ▷
Solana Beach Med
124 North Rios
Solana Beach, CA 92075

Back | Submit | Check Eligibility | Add Service

FIGURE 6

SYSTEM AND METHOD FOR COORDINATION OF BENEFITS IN A HEALTHCARE SYSTEM

CROSS REFERENCE TO RELATED APPLICATIONS

The present application is related to U.S. patent application Ser. No. 11/495,098 entitled "Healthcare Eligibility And Benefits Data System."

FIELD OF THE INVENTION

The present invention relates generally to benefits management in healthcare systems.

BACKGROUND

This section is intended to provide a background or context to the invention recited in the claims. The description herein may include concepts that could be pursued or may have been pursued, but are not necessarily ones that have been previously conceived or pursued. Therefore, unless otherwise indicated herein, what is described in this section is not prior art to the description and claims in this application and is not admitted to be prior art by inclusion in this section.

Generally speaking, healthcare providers send bills to payers as medical claims. These medical claims can be sent on paper via CMS 1500 form (professional) or UB-92 form (intuitional). Medical claims can also be sent electronically in the HIPAA 837 format (837p or 837i). In certain circumstances, a patient can have insurance from multiple payers (for example, a wife insures a husband and employer insures the husband, too). When a patient has two or more insurance companies, one insurance payer is considered the "primary payer" and that payer is billed first by the provider. Other payers are considered secondary, tertiary etc. and are billed sequentially. The process of billing multiple payers for one patient is also called COB or coordination of benefits. The majority of claims received by a payer are primary claims, only a small percentage of medical claims are secondary or greater to the previous claim.

Not all payers can accept and process COB claims electronically. The majority of providers do not send 837 COB claims Further, the majority of providers send a paper EOB (explanation of benefits) from the previous payer with a paper CMS 1500 or UB-92 form to the COB payer via the regular mail. The paper EOB from the previous payer is required to facilitate the adjudication of the claim by the COB payer. The paper EOB shows the COB payer what adjustments were made to the previous claim and how each service line was paid and adjusted. It also shows the total amount paid and what the patient responsibility was for the claim. Accordingly, providers are faced with using a costly paper-based procedure to process COB claims. As such, there is a need for a system and method which allows providers to electronically process COB claims to payers, even in the situations where providers do not have electronic data for the patient or a compatible medical billing software product.

SUMMARY

According to at least one exemplary embodiment, a healthcare system coordinating benefits includes a provider computer configured to receive patient information for a patient and to communicate a payment request to a payer computer. The provider computer includes programmed instructions to identify a coordination of benefits claim, obtain certain data from a response received from the payer computer in response to requests from the provider computer, store the certain data from the response, and provide the stored certain data in a coordination benefits claim.

Exemplary systems comprise a variety of aspects. The stored certain data can include a patient member number and a patient date of birth. The response received from the payer computer can include HIPAA 837 data or HIPAA 835 data. The provider computer can include an interface having a coordination of benefits selection and instructions to translate adjustment codes. Providing the stored data can include pre-filling the coordination of benefits claim with prior transaction data. The prior transaction data can further include electronic remittance advice data.

According to another exemplary embodiment, a method of managing coordination benefits data can include identifying a coordination of benefits opportunity, determining whether data is available to pre-fill a coordination of benefits claim, pre-filling the coordination of benefits claim if data is available, and communicating the coordination of benefits claims to multiple payers.

Exemplary methods comprise a variety of aspects. For example, the method can adjust costs based on multiple payers associated with the coordination of benefits claim. The method can further include receiving additional data to complete the coordination of benefits claim. The data to pre-fill the coordination of benefits claim can include HIPAA 837 data. In the method, identifying a coordination of benefits opportunity can include receiving a signal indicating a patient having multiple payers. Moreover, communicating the coordination of benefits claims to multiple payers can include submitting the coordination of benefits claims to a primary payer and a secondary payer. Further, communicating the coordination of benefits claims to multiple payers can include communicating the coordination of benefits claims over the Internet.

According to an exemplary embodiment, the computer program product includes programmed instructions to identify a coordination of benefits opportunity, programmed instructions to determine whether data is available to pre-fill a coordination of benefits claim, programmed instructions to pre-fill the coordination of benefits claim if data is available, and programmed instructions to communicate the coordination of benefits claims to multiple payers.

As used herein, healthcare refers to services offered by the health profession. Healthcare is one example implementation of the exemplary embodiments. Eligibility refers to qualified or entitled to receive. Benefits refers to something that helps or aids. Provider computer refers to a machine used by a service provider, such as a healthcare provider. Payer computer refers to a machine used by a payer company, such as a health insurance company. HIPAA refers to the Health Insurance Portability and Accountability Act of 1996.

These and other features, aspects and advantages of the present invention will become apparent from the following description, appended claims, and the accompanying exemplary embodiments shown in the drawings, which are briefly described below.

DETAILED DESCRIPTION OF EXEMPLARY EMBODIMENTS

Exemplary embodiments will be described below with reference to the accompanying drawings. It should be understood that the following description is intended to describe exemplary embodiments of the invention, and not to limit the invention.

Figure 1:
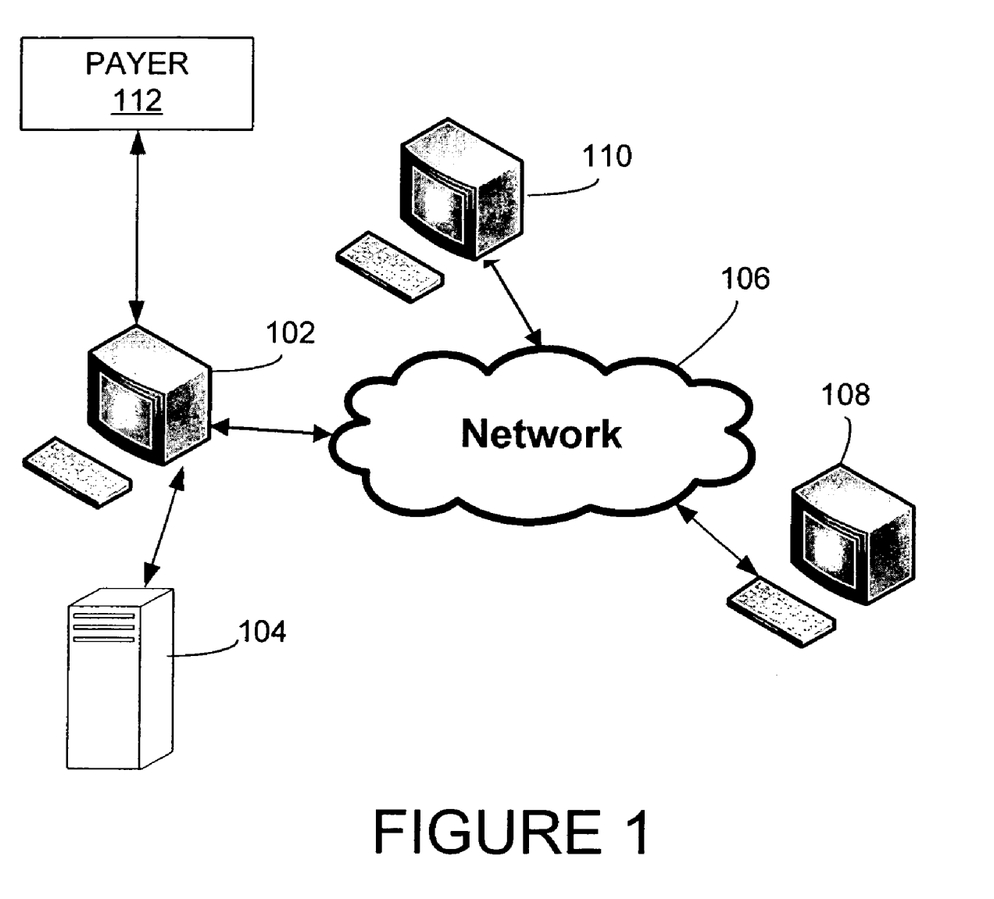
FIG. 1 is a diagram illustrating a healthcare system in accordance with an exemplary embodiment.

FIG. 1 illustrates an exemplary healthcare eligibility and benefits data system 100. The system 100 includes a computer 102 and a database 104. The system 100 is coupled to a network 106 by which the system 100 can communicate with provider systems 108 and 110. In some embodiments, system 100 communicates with provider systems 108 or 110 via non-Internet network connections. The system 100 communicates with a payer system 112 directly or via a network (not shown), which can be a virtual private network (VPN), a secure file transfer protocol (SFTP), a high speed line, an Internet-based network, or a dedicated network.

Providers 108 and 110 submit and receive real-time transactions with system 100. For example, providers 108 and 110 submit claims to the system 100 and download ERA from system 100. The system 100 sends claims and real-time requests to the payer system 112, and the system 100 receives claims, real-time responses, and electronic remittance advice (ERA) from the payer system 112. The computer 102 has software including an operation system that provides various system-level operations and provides an environment for executing application software. In this regard, computer 102 is loaded with a software application that provides information for use in communications with provider systems and payer systems.

The Health Insurance Portability and Accountability Act (HIPAA) requires that all health insurance payers in the United States comply with the electronic data interchange (EDI) standards for health care as establish by the Secretary of Health and Human Services (HHS). EDI standard 835 is the HIPAA-defined standard for electronic transmission of EOB information. The format of an electronic EOB is referred to as an electronic remittance advice (ERA). In some situations, 835 data accompanies an Electronic Funds Transfer from the payer. The payer is not required to mail a check and a paper EOB statement by coupling related but separate transactions. Electronic transactions save money for the payer in check processing and mailing fees. Providers also benefit from the efficiencies and security of electronic EOBs. Providers can also upload 835 data and use it to reconcile outstanding patient account balances. In such a situation, the provider does not have to manually post payments from a paper EOB. The computer 102 can receive 835 files for many providers in a batch. An 835 file from a single payer may include many individual 835 files. The computer 102 parses payer files available to providers. These provider files can be viewed on a web browser, viewed as a file (e.g., a pdf file, or downloaded as a coded file that can be uploaded to an accounting system.)

Figure 2:
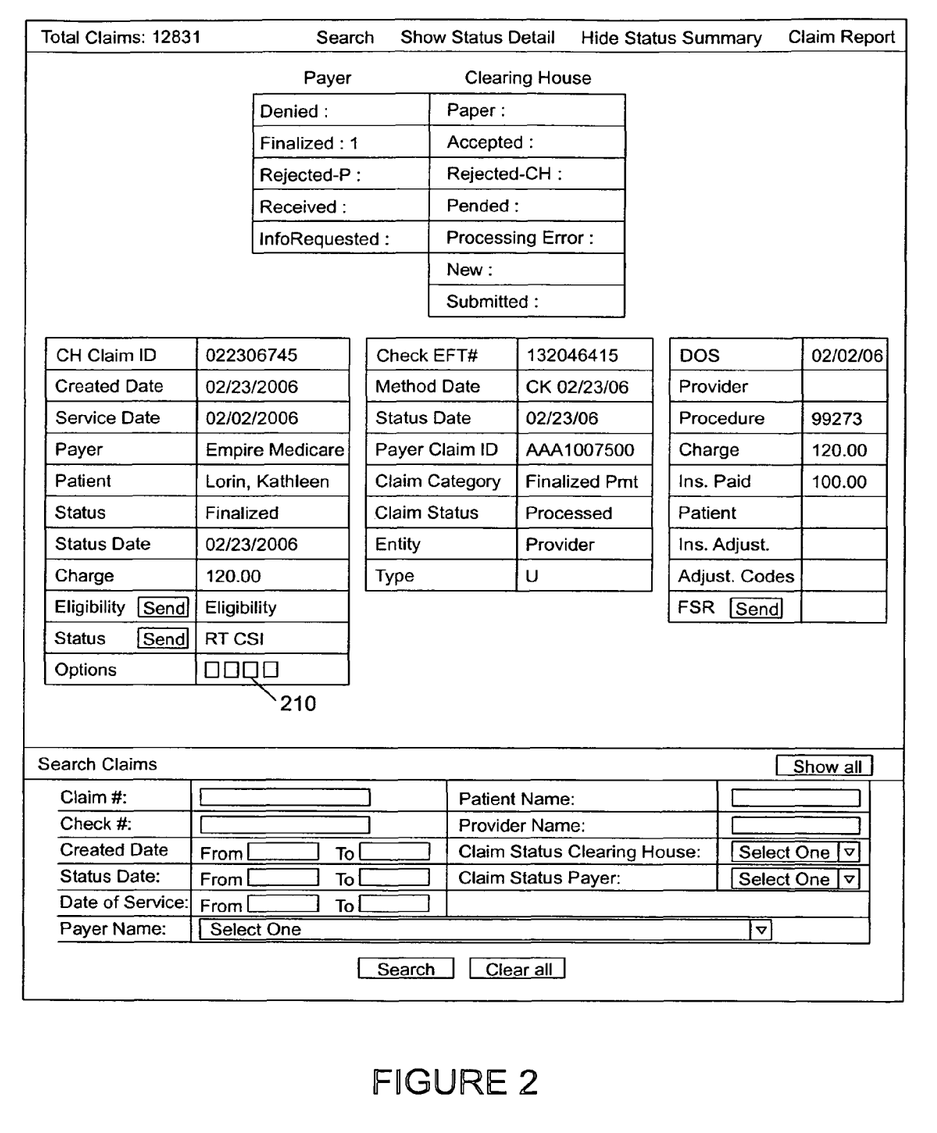
FIG. 2 is a screen display of an interface detailing claim status in accordance with an exemplary embodiment.

FIG. 2 illustrates a screen display of an interface detailing claim status for a previous claim paid by a payer. Icon 210 engages a process by which coordination of benefits (COB) claims are submitted. COB refers to the process of billing multiple payers for one patient. Generally, most claims received by a payer are primary claims; fewer claims are secondary or greater to the previous claim.

HIPAA guidelines indicate that COB claims should be processed by provider or payers exchanging 835 data, which, as discussed above is the EDI standard for electronic transmission of EOB information, also referred to as an electronic remittance advice (ERA). The exemplary embodiments described herein allow providers that do not receive 835 data or do not have a medical billing software product to send COB claims to payers. The COB claim submission can be made without the benefit of pre-filling from a prior transaction, such as an 837 or 835 transaction. If previous 837 or 835 information is available, most of the required fields can be extracted and used in the COB claim.

Figure 3:
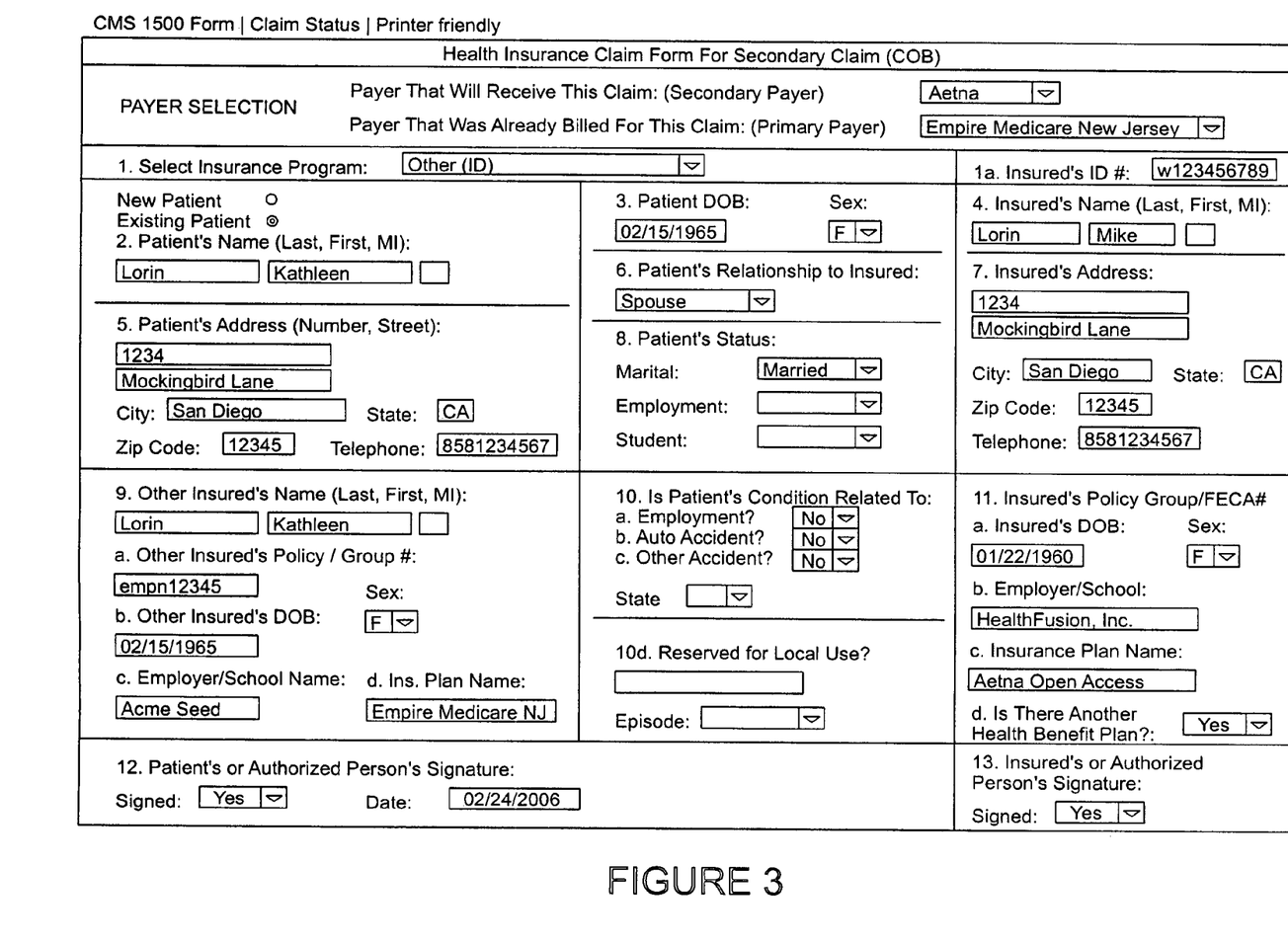
FIGS. 3, 4, and 5 are screen displays of an interface for secondary claim information in accordance with an exemplary embodiment.
Figure 4:
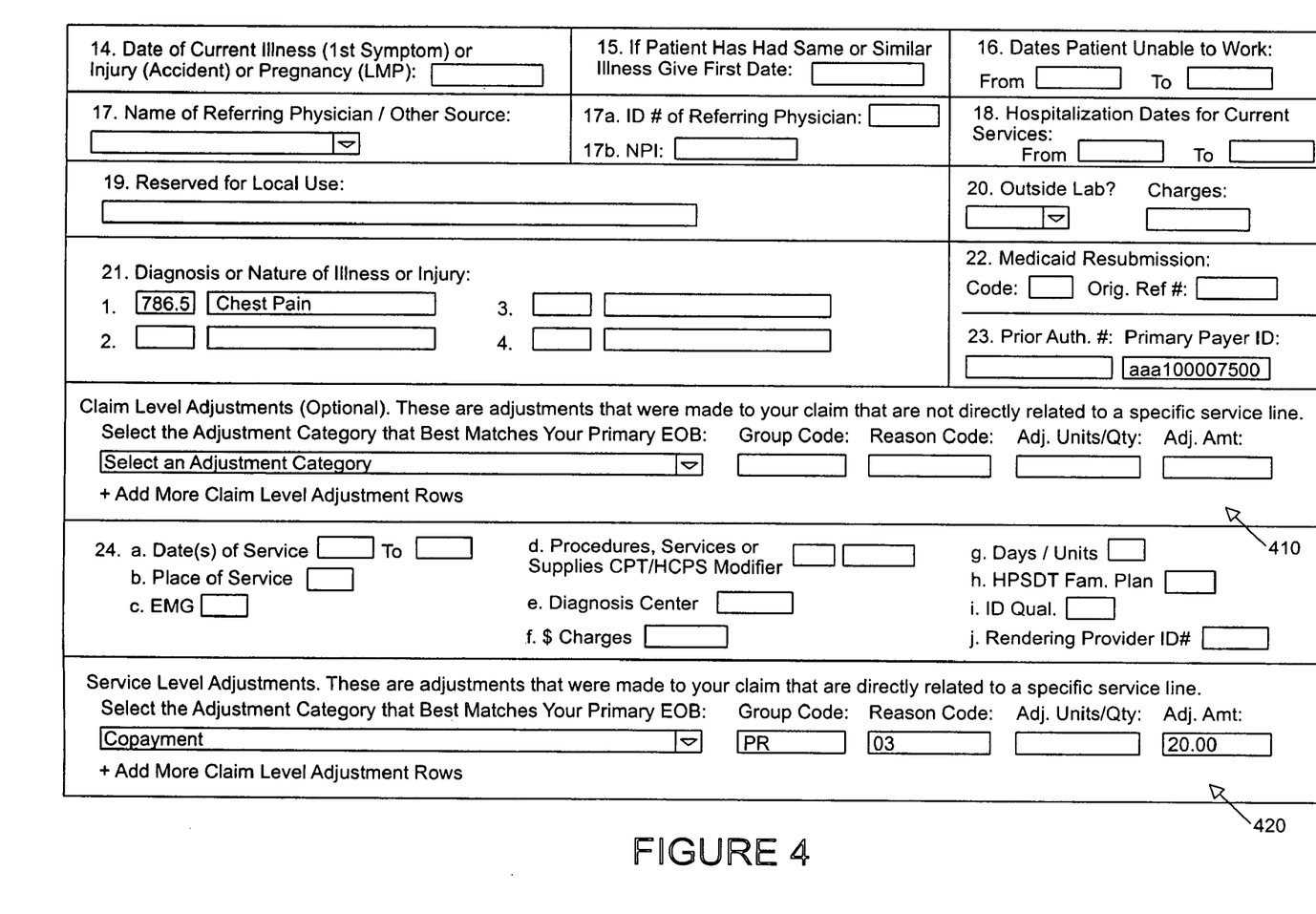
Figure 5:
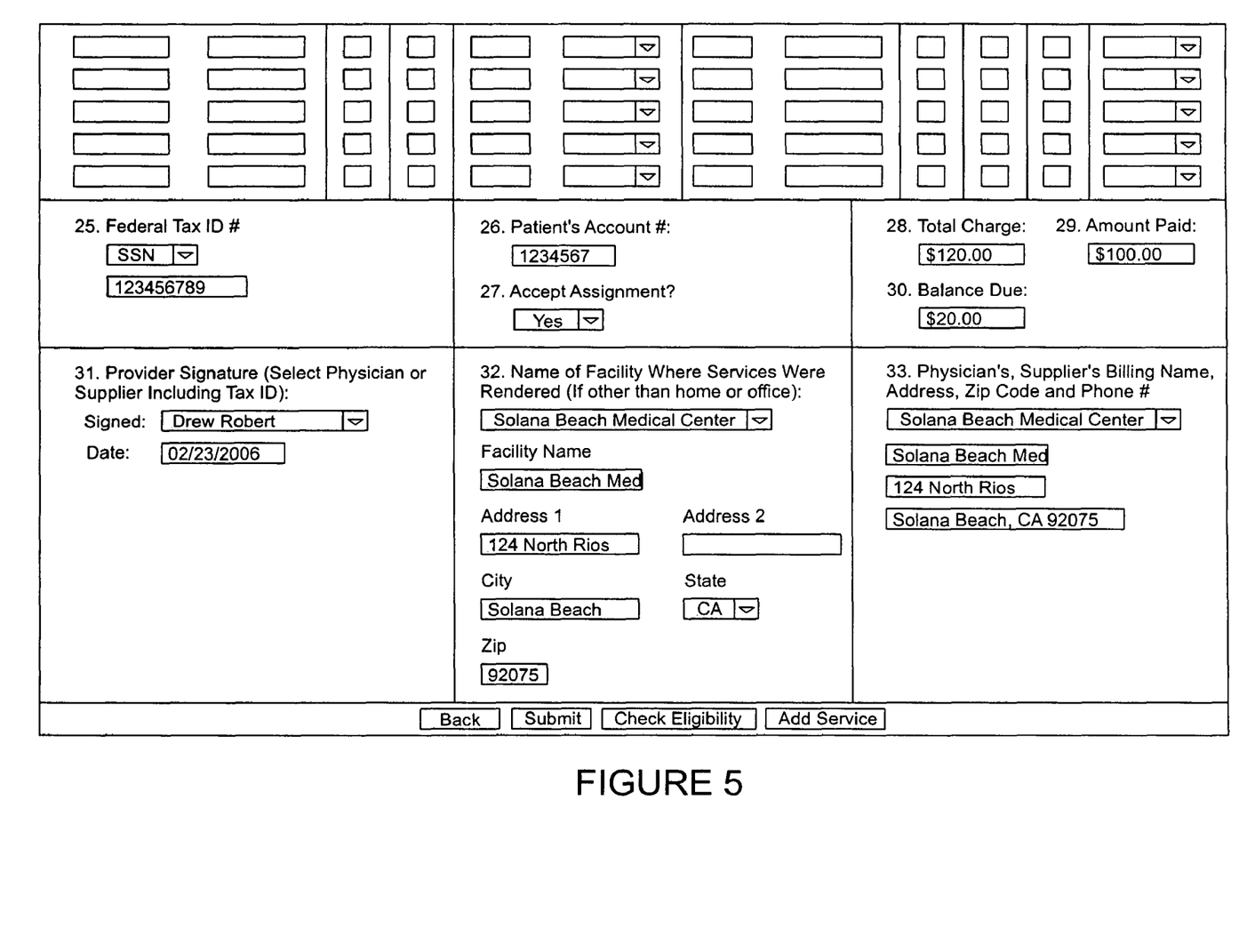

FIGS. 3, 4, and 5 illustrate screen displays of an interface for secondary claim information. The interface permits the creation of COB claims that are compliant with the HIPAA 837 standard. The COB payer can use the data generated using this interface to adjudicate the COB claim electronically. As suggested above, fields in the interface may be pre-filled if there exists previous 837 or 835 information corresponding to the claim. However, previous 837 or 835 information is not required. In at least one exemplary embodiment, colors are used to show data status. For example, yellow may be used to show data that is pre-filled from previous 837 or 835 information and, therefore, not editable. Green may be used to show data that is pre-filled but editable. Blue can be used to show blank fields required for completion by the user.

Section 410 of the interface includes an adjustment code translator at a claim level and section 420 of the interface includes an adjustment code translator at a service line level. These translators allow the user to select a typical adjustment category and translate the category to HIPAA- and payer-approved group and reason codes.

Figure 6:
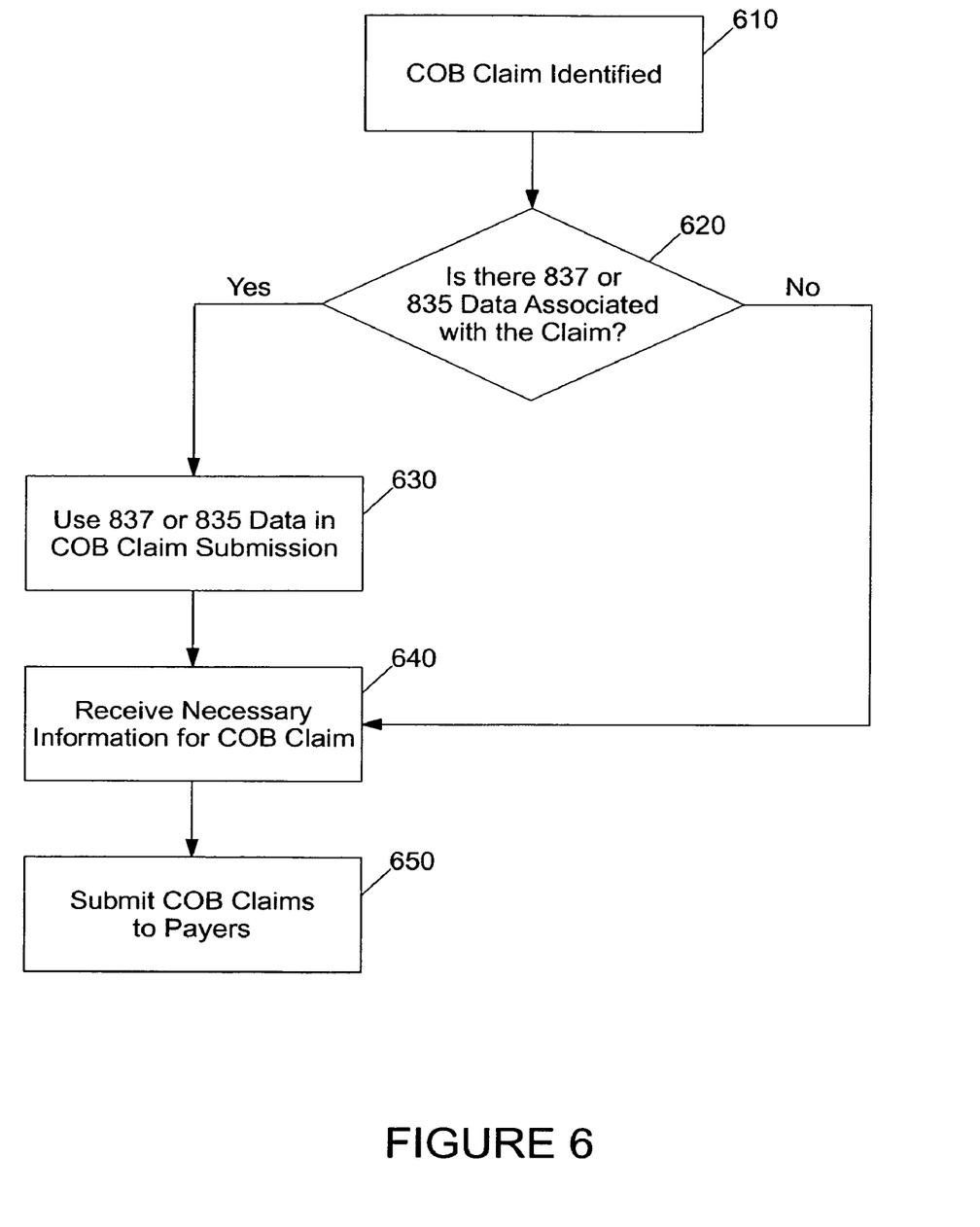
FIG. 6 is a flow diagram depicting operations performed for a coordination of benefits feature in a healthcare eligibility and benefits data system.

FIG. 6 is a flow diagram depicting operations performed for a coordination of benefits feature in a healthcare eligibility and benefits data system. Additional, fewer, and different operations may be performed depending on the particular implementation. In an operation 610, a coordination of benefits (COB) claim is identified. As discussed above, a COB claim is one in which multiple payers are available for payment of a claim. For instance, a husband and a wife may both have medical insurance and one insurance pays as a secondary insurance to the first.

In an operation 620, a determination is made whether there is 837 or 835 data associated with the claim that is available. If so, an operation 630 is performed where the 837 or 835 data is utilized in the COB claim submission. Such 837 or 835 data can pre-populate fields needed for the COB claim. In an operation 640, information necessary for the COB claim is entered in an interface, such as the interface described with reference to FIGS. 3, 4, and 5. In an operation 650, the COB claim is submitted to the payers.

Conventionally, health care providers must have medical billing software that supports the creation of COB claims. Also, many current systems lack the 835 data or have incompatible systems. Such providers then must send a paper COB which can cost $10 per claim. In contrast, an electronic COB claim may be only $1 per claim. The systems and methods described herein allow providers to process COB claims even though they do not receive 835 data and even though they may not have a medical billing software product to send COB claims to payers.

It should be appreciated, of course, that the details associated with the product described herein merely represent one possible implementation. Exemplary embodiments are described herein with reference to drawings. These drawings illustrate certain details of specific embodiments that implement the systems and methods and programs of the exemplary embodiments. However, describing the exemplary embodiments with drawings should not be construed as imposing on the invention any limitations that may be present in the drawings. The present invention contemplates methods, systems and program products on any machine-readable media for accomplishing it operations. The exemplary embodiments may be implemented using an existing computer processor, or by a special purpose computer processor incorporated for this or another purpose or by a hardwired system.

Embodiments may include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EPROM, CD-ROM or other optical disk storage, magnetic disk storage or other magnetic storage devices, or any other medium which can be used to carry or stored desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments are described in the general context of method operations which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods described herein. The particular sequence of such executable instructions or associated data structures represent examples of corresponding acts for implementing the functions described in such operations.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links or by a combination of hardwired and wireless links) through a communications network. In a distributed computing environment, program modules may be located in both local and remote memory storage devices.

It should be noted that although the flow charts provided herein show a specific order of method operations, it is understood that the order of these operations may differ from what is depicted. Also two or more operations may be performed concurrently or with partial concurrence. Such variation will depend on the software and hardware systems chosen and on designer choice. Likewise, software and web implementations of the exemplary embodiment could be accomplished with standard programming techniques with rule based logic and logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of exemplary embodiments have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

The invention claimed is:

1. A healthcare system coordinating benefits, the system comprising:
a provider computer configured to:
receive patient information for a patient;
communicate a payment request for a claim to a payer computer;
receive a payment response from the payer computer in response to the payment request for the claim;
obtain the data associated with the patient from the payment response received from the payer computer;
store the data associated with the patient from the payment response;
identify a coordination of benefits claim and multiple payer computers associated with the coordination of benefits claim;
populate the coordination of benefits claim for the patient with the data associated with the patient from the payment response; and
send the coordination of benefits claim to the multiple payer computers associated with the coordination of benefits claim.

2. The system of claim 1, wherein the data associated with the patient comprises a patient member number and a patient date of birth.

3. The system of claim 1, wherein the payment response includes HIPAA 837 data, and wherein the provider computer is further configured to obtain the data associated with the patient from the HIPAA 837 data.

4. The system of claim 1, wherein the payment response includes HIPAA 835 data.

5. The system of claim 1, wherein the provider computer includes an interface having a coordination of benefits selection.

6. The system of claim 1, wherein the provider computer is further configured to translate adjustment codes.

7. The system of claim 1, wherein the provider computer is further configured to pre-fill the coordination of benefits claim with prior transaction data.

8. The system of claim 7, wherein the prior transaction data includes electronic remittance advice data.

9. A non-transitory computer-readable medium having instructions thereon that, in response to execution by a computing device, cause the computing device to perform operations comprising:
    receiving patient information for a patient;
    communicating a payment request for a claim to a payer computer;
    receiving a payment response from the payer computer in response to the payment request for the claim;
    obtaining the data associated with the patient from the payment response received from the payer computer;
    storing the data associated with the patient from the payment response;
    identifying a coordination of benefits claim and multiple payer computers associated with the coordination of benefits claim;
    populating the coordination of benefits claim for the patient with the data associated with the patient obtained from the payment response; and
    sending the coordination of benefits claim to the multiple payer computers associated with the coordination of benefits claim.

10. The non-transitory computer-readable medium of claim 9, wherein the instructions, in response to execution by a computing device, cause the computing device to perform operations further comprising adjusting costs based on multiple payers associated with the coordination of benefits claim.

11. The non-transitory computer-readable medium of claim 9, wherein the data associated with the patient comprises HIPAA 837 data.

12. The non-transitory computer-readable medium of claim 9, wherein said sending the coordination of benefits claim comprises submitting the coordination of benefits claims to a primary payer and a secondary payer.

13. The non-transitory computer-readable medium of claim 9, wherein the data associated with the patient comprises a patient member number and a patient date of birth.

14. The non-transitory computer-readable medium of claim 9, wherein the payment response includes HIPAA 835 data, and wherein the data associated with the patient comprises at least a portion of the HIPAA 835 data.

15. A method comprising:
    receiving, by a provider computer, patient information for a patient;
    communicating a payment request for a claim from the provider computer to a payer computer;
    receiving, by the provider computer, a payment response from the payer computer in response to the payment request for the claim;
    obtaining, by the provider computer, the data associated with the patient from the payment response received from the payer computer;
    storing the data associated with the patient from the payment response using the provider computer;
    identifying, using the provider computer, a coordination of benefits claim and multiple payer computers associated with the coordination of benefits claim;
    populating, by the provider computer, the coordination of benefits claim for the patient with the data associated with the patient obtained from the payment response; and
    sending the coordination of benefits claim from the provider computer to the multiple payer computers associated with the coordination of benefits claim.

16. The method claim 15, further comprising adjusting costs, by the provider computer, based on multiple payers associated with the coordination of benefits claim.

17. The method claim 15, wherein the data associated with the patient comprises HIPAA 837 data.

18. The method claim 15, further comprising receiving, at the provider computer, a signal indicating a patient has multiple payers.

19. The method claim 15, wherein said sending the coordination of benefits claim comprises submitting the coordination of benefits claims to a primary payer and a secondary payer.

20. The method claim 15, wherein the payment response includes HIPAA 835 data, and wherein the data associated with the patient comprises at least a portion of the HIPAA 835 data.

* * * * *